(12) United States Patent
Williams et al.

(10) Patent No.: US 10,004,188 B2
(45) Date of Patent: Jun. 26, 2018

(54) GROWING SYSTEM

(71) Applicant: Apex Farms Corp., Wilmington, DE (US)

(72) Inventors: Justin S. Williams, Denver, CO (US); Alexander M. Woods-Leo, Wilmington, DE (US)

(73) Assignee: Apex Farms Corp., Wilmington, DE (US)

( * ) Notice: Subject to any disclaimer, the term of this patent is extended or adjusted under 35 U.S.C. 154(b) by 0 days. days.

(21) Appl. No.: 15/788,225

(22) Filed: Oct. 19, 2017

(65) Prior Publication Data

US 2018/0035627 A1 Feb. 8, 2018

Related U.S. Application Data

(63) Continuation-in-part of application No. 14/846,298, filed on Sep. 4, 2015, now Pat. No. 9,795,097.

(60) Provisional application No. 62/046,485, filed on Sep. 5, 2014.

(51) Int. Cl.
*A01G 31/00* (2018.01)
*A01G 31/06* (2006.01)
*A01G 1/00* (2006.01)
*A01G 22/00* (2018.01)

(52) U.S. Cl.
CPC .............. *A01G 31/06* (2013.01); *A01G 1/001* (2013.01); *A01G 22/00* (2018.02); *A01G 2031/006* (2013.01)

(58) Field of Classification Search
CPC ......... A01G 31/06; A01G 31/02; A01G 31/00
See application file for complete search history.

(56) References Cited

U.S. PATENT DOCUMENTS

| | | | | |
|---|---|---|---|---|
| 3,365,840 A | * | 1/1968 | Cooper | A01G 11/00 47/59 R |
| 4,255,896 A | * | 3/1981 | Carl | A01G 31/06 47/62 C |
| 4,324,069 A | * | 4/1982 | Flagg | A01G 27/001 47/62 E |
| 4,630,394 A | * | 12/1986 | Sherard | A01G 31/02 47/18 |
| 5,473,874 A | * | 12/1995 | Nilsen | A01D 46/00 47/65 |

(Continued)

OTHER PUBLICATIONS

Screenshots of Video at https://www.youtube.com/watch?v=EJjAWF2DfWY; Printed on Aug. 26, 2015.

*Primary Examiner* — Kristen C Hayes
(74) *Attorney, Agent, or Firm* — Neustel Law Offices

(57) ABSTRACT

A growing system for providing fluids to a plurality of growing assemblies using only a single pump and fluid source. The growing system generally includes a single fluid source such as a reservoir from which fluids are drawn by a single pump. A main manifold connected to the pump outlet splits the fluids drawn from the fluid source into a plurality of feeder pipes. Each of the feeder pipes provides fluid to a separate growing assembly; with the present invention providing support for a plurality of growing assemblies. Each growing assembly comprises an inlet manifold for receiving the fluids, a plurality of growing pipes for providing the fluids to a plurality of planters, and a drainage device for discharging fluids back into the fluid source for further use.

17 Claims, 19 Drawing Sheets

(56) References Cited

U.S. PATENT DOCUMENTS

| | | | |
|---|---|---|---|
| 8,065,833 B2* | 11/2011 | Triantos | A01G 31/02 47/62 R |
| 9,532,518 B2* | 1/2017 | Kotsatos | A01G 31/06 |
| 2014/0000162 A1* | 1/2014 | Blank | A01G 31/06 47/62 A |

* cited by examiner

GROWING SYSTEM

CROSS REFERENCE TO RELATED APPLICATIONS

The present application is a continuation-in-part of U.S. application Ser. No. 14/846,298 filed on Sep. 4, 2015, which claims priority to U.S. Provisional Application No. 62/046,485 filed Sep. 5, 2014. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a Growing System for providing fluids to a plurality of growing assemblies using only a single pump and fluid source.

Related Art

Any discussion of the related art throughout the specification should in no way be considered as an admission that such related art is widely known or forms part of common general knowledge in the field.

The market for growing systems is growing in size and demand. The demand for these types of systems will increase as land for farming decreases due to population growth. There is also a need to conserve water resources and minimize the number of separate pumping installations for multiple growing systems. Vertical planting towers are known in the art; however these planting devices each require an individual reservoir. If used outdoors with sunlight, the plantings only receive direct sunlight for part of the day. Other prior art systems contain rows disposed in a rectangular arrangement. However, these systems are not suitable for large scale farming where each growing site must be exposed to direct sunlight throughout the day without significant shading issues.

Because of the inherent problems with the related art, there is therefore a need for a new and improved growing system that is able to operate multiple rows of plantings from one reservoir, with a triangular design to maximize direct sunlight, minimize shading, and enable direct access to each growing site from either side of the system for easy maintenance of the plants that would not be as accessible with a rectangular configuration. There is furthermore a need to maximize plant yield and conserve water resources over conventional farming methods.

SUMMARY

An example embodiment is directed to a Growing System having tiered rows of enclosed rigid pipe for the growing sites. The growing system is preferably a hydroponic aquaponic system, but may also be used for soil-based systems. Unlike previous growing systems, the rows are unslanted and use the force of a pump, rather than gravity, to distribute water to the rows. With the rows arranged in a north-south direction, the growing sites are subject to limited shading. The triangular design further enables direct access to each growing site from either side of the system. Because of its ease of cultivation access and maximized exposure to sunlight, the invention described herein triples plant yield per square foot over other vertical growing systems. By recycling water from the vertical growing system back to a reservoir, the invention described herein uses 75% less water than conventional farming methods. By utilizing a single fluid source and pump to feed multiple such growing assemblies, the present invention provides even more conservation and efficiency in growing operations.

There has thus been outlined, rather broadly, some of the embodiments of the Growing System in order that the detailed description thereof may be better understood, and in order that the present contribution to the art may be better appreciated. There are additional embodiments of the Growing System that will be described hereinafter and that will form the subject matter of the claims appended hereto. In this respect, before explaining at least one embodiment of the Growing System in detail, it is to be understood that the Growing System is not limited in its application to the details of construction or to the arrangements of the components set forth in the following description or illustrated in the drawings. The Growing System is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
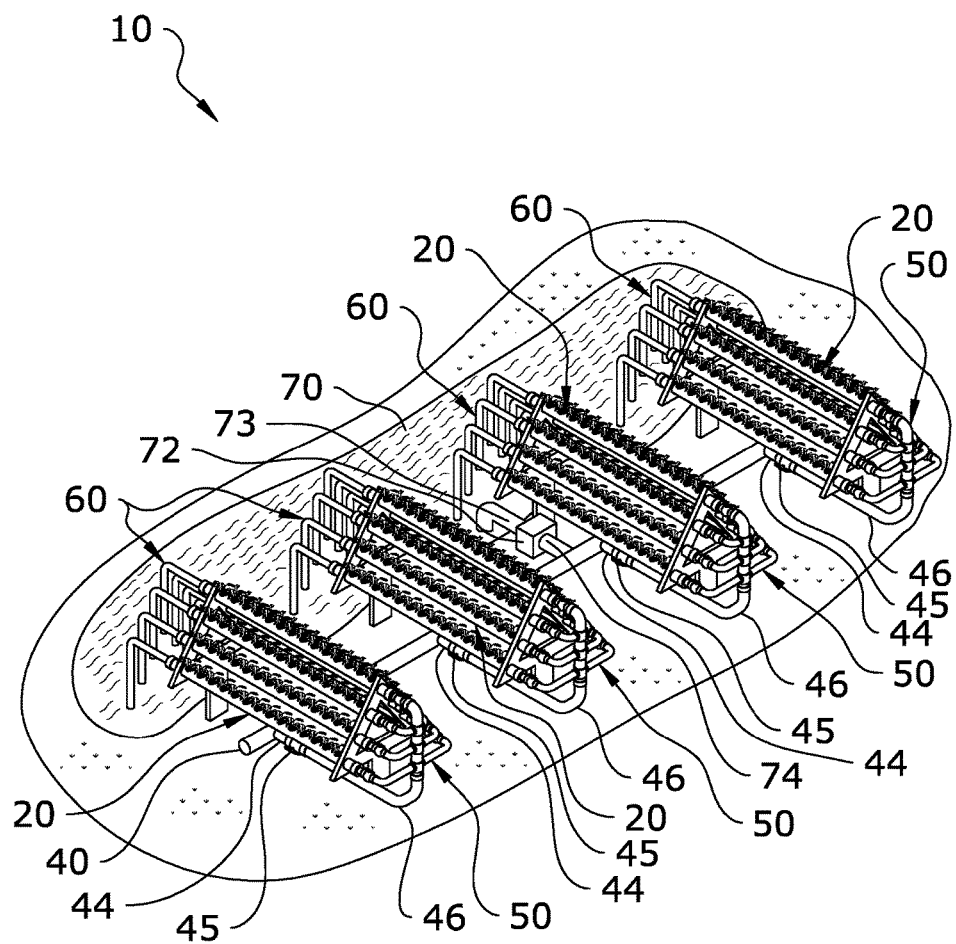
FIG. 1 is an upper perspective view of the present invention.
Figure 2:
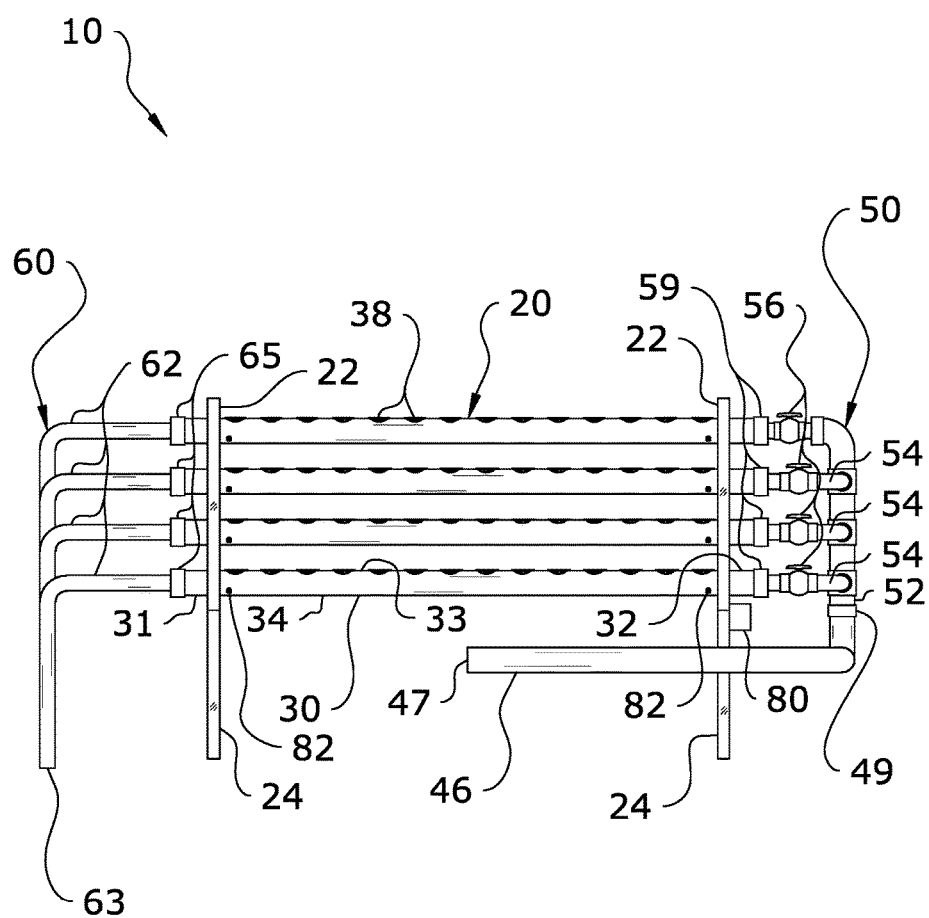
FIG. 2 is a first side view of a growing assembly of the present invention.

Turning now descriptively to the drawings, in which similar reference characters denote similar elements throughout the several views, FIGS. 1 through 13 illustrate an exemplary embodiment of the growing system 10 of the present invention. The growing system 10 may comprise a plurality of growing assemblies 20; each having triangle-shaped frames 22 made of steel, aluminum or other suitable materials, with stainless steel being preferable due to its ability to resist rusting. The frames 22 can vary in height and width and, when comprised of a triangular configuration, are configured to have one side of the triangle parallel to the ground.

The frames 22 are spaced apart and are parallel to one another to support a plurality of non-inclined, removable, enclosed growing pipes 30 uniformly distributed in tiered rows. The length of the growing assemblies 20 may vary depending on the length of the growing pipes 30. In one embodiment, the length of the growing assemblies 20 may each be approximately 20 feet long at its base and approximately 6 feet in height at the apex of the triangle. The plurality of growing assemblies 20 are fed by a singular main manifold 40, which is preferably 6-inch round pipe, containing manifold valves 45 to control the flow of water through each growing assembly 20.

The rigid pipe 14 may be at least partially comprised of PVC pipe or other suitable material. The size of the rigid pipe 14 can vary but may be approximately 2-3 inches in diameter, and approximately 20 feet in length. At the end of each rigid pipe 14 is a pipe reducer 18. The size of the pipe reducer 18 is selected based on the size of the rigid pipe 14 but preferably comprises a 75% reduction in diameter from the system manifold pipe 13. The pipe reducer 18 serves the purpose of slowing down the water flow rate within the rigid pipe 14 and ensuring that every plant in the rigid pipe 14 receives a uniform amount of water.

Figure 8:
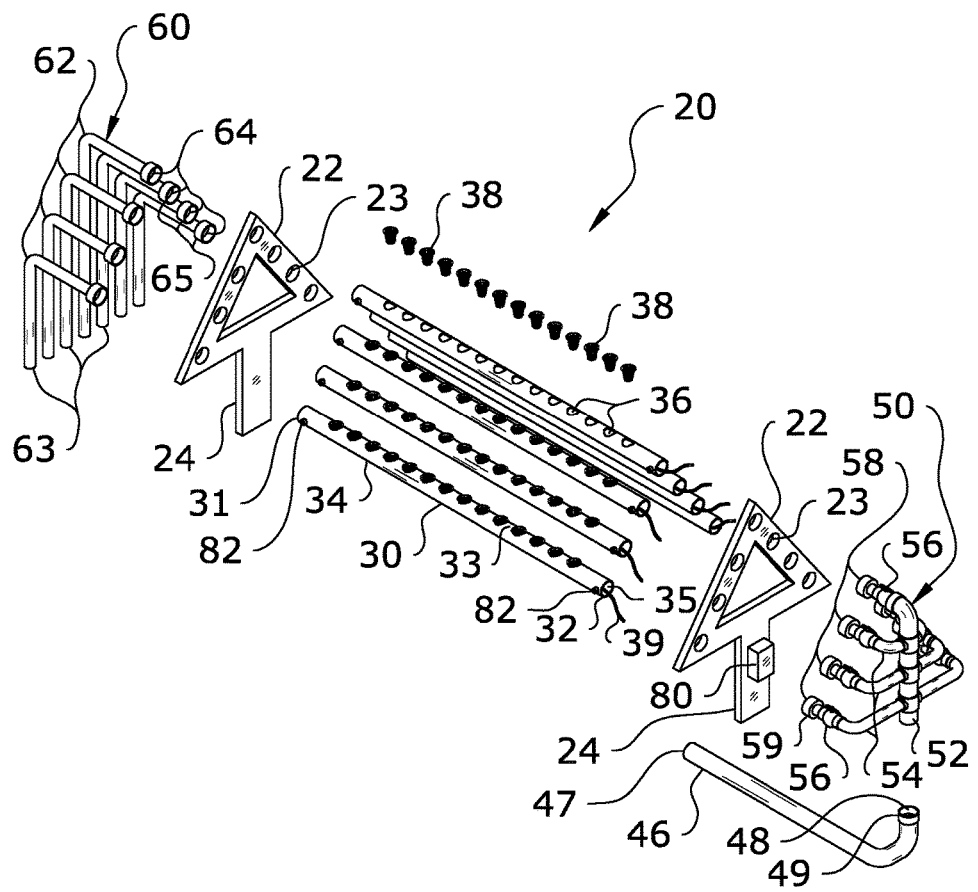
FIG. 8 is an exploded perspective view of a growing assembly of the present invention.
Figure 9:
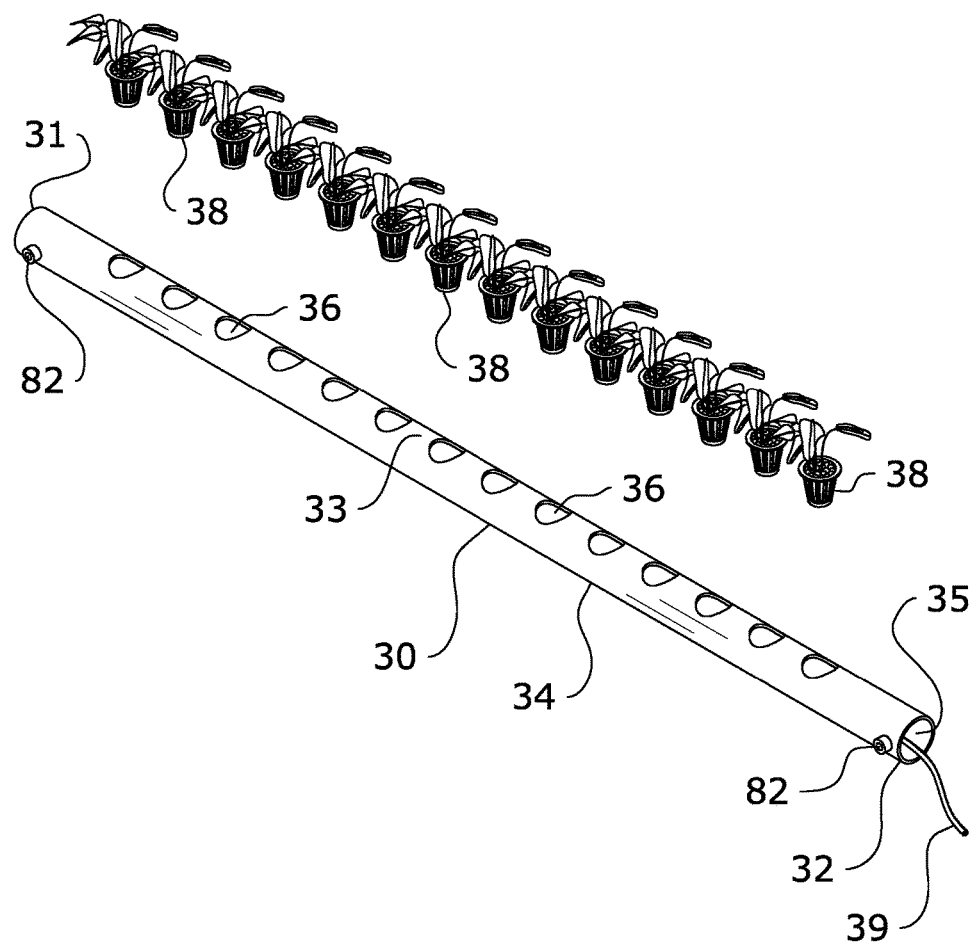
FIG. 9 is an upper perspective view of a growing pipe and planters of the present invention.
Figure 10:
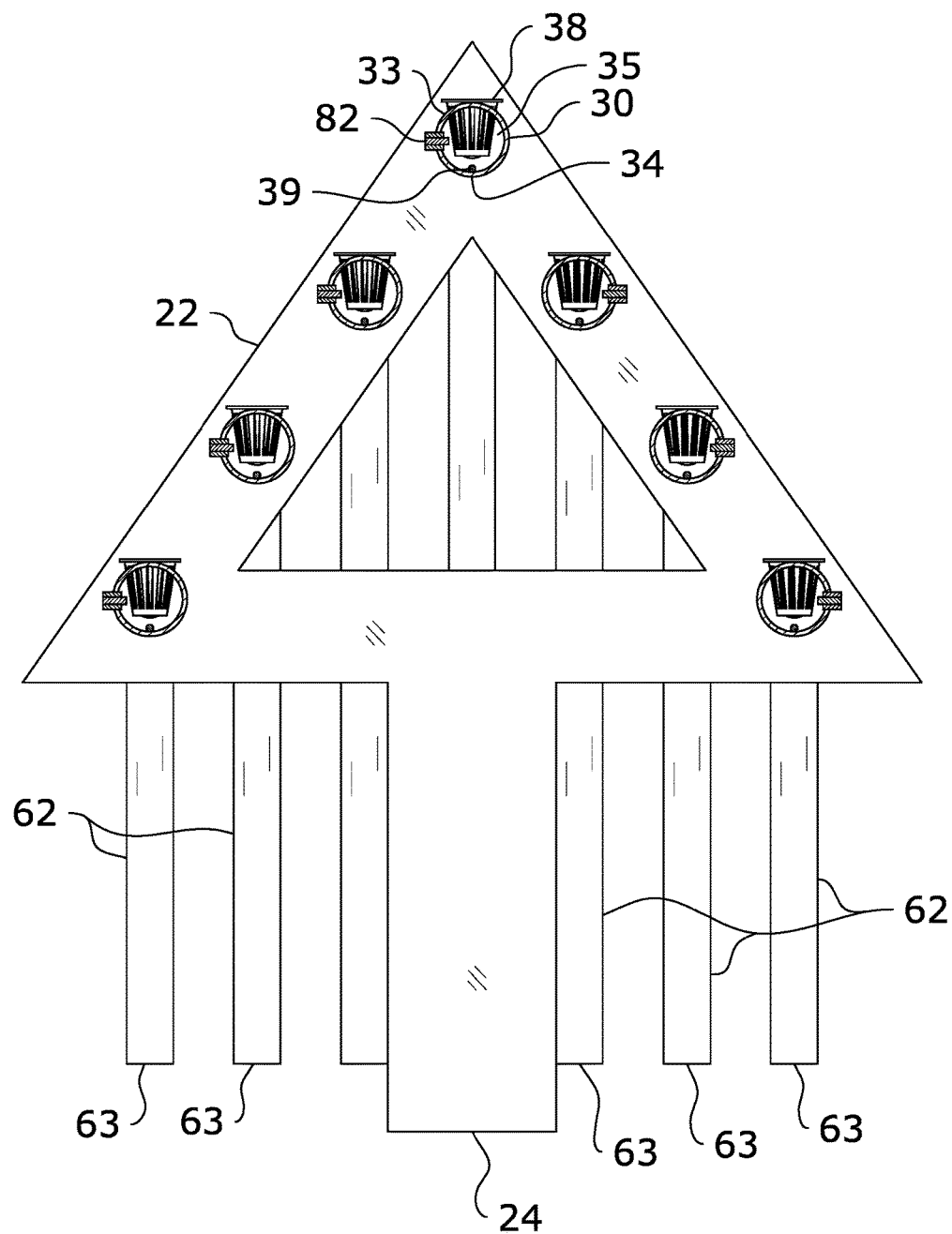
FIG. 10 is a frontal sectional view of a growing assembly of the present invention.
Figure 11:
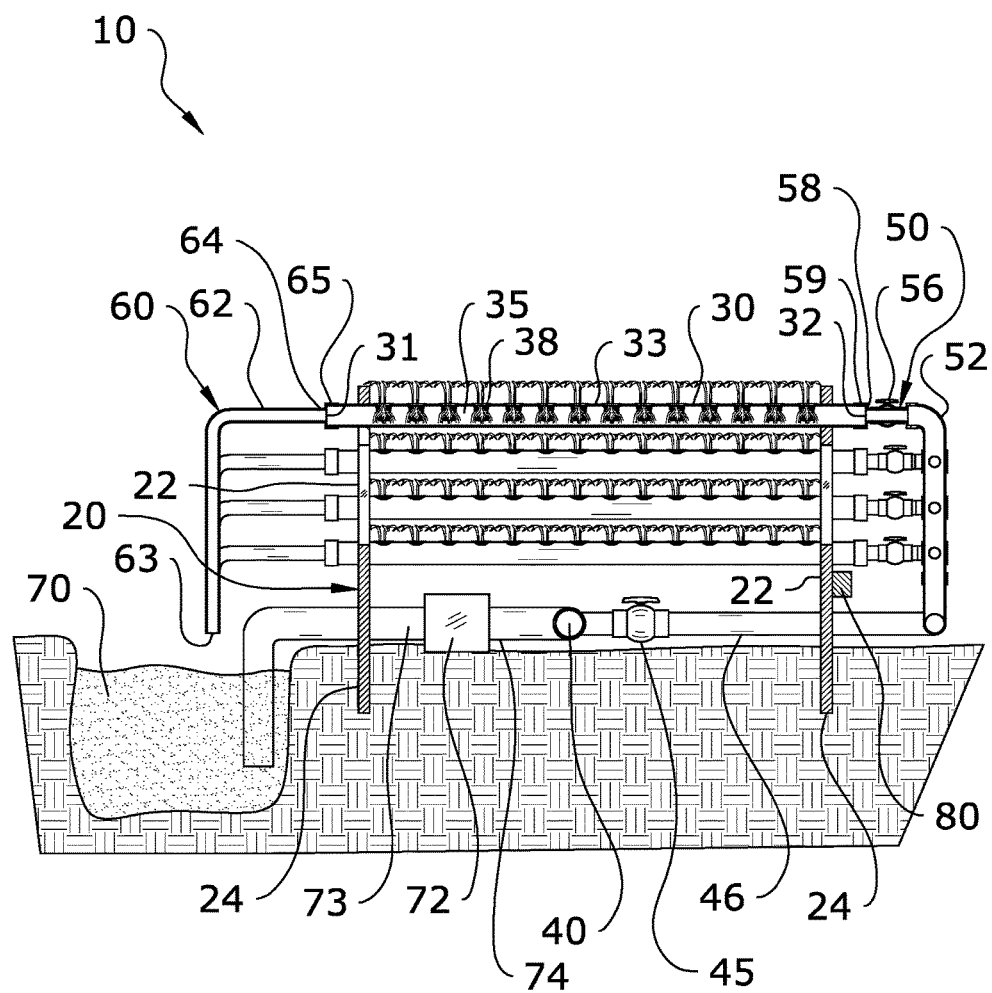
FIG. 11 is a side sectional view of the present invention.
Figure 12:
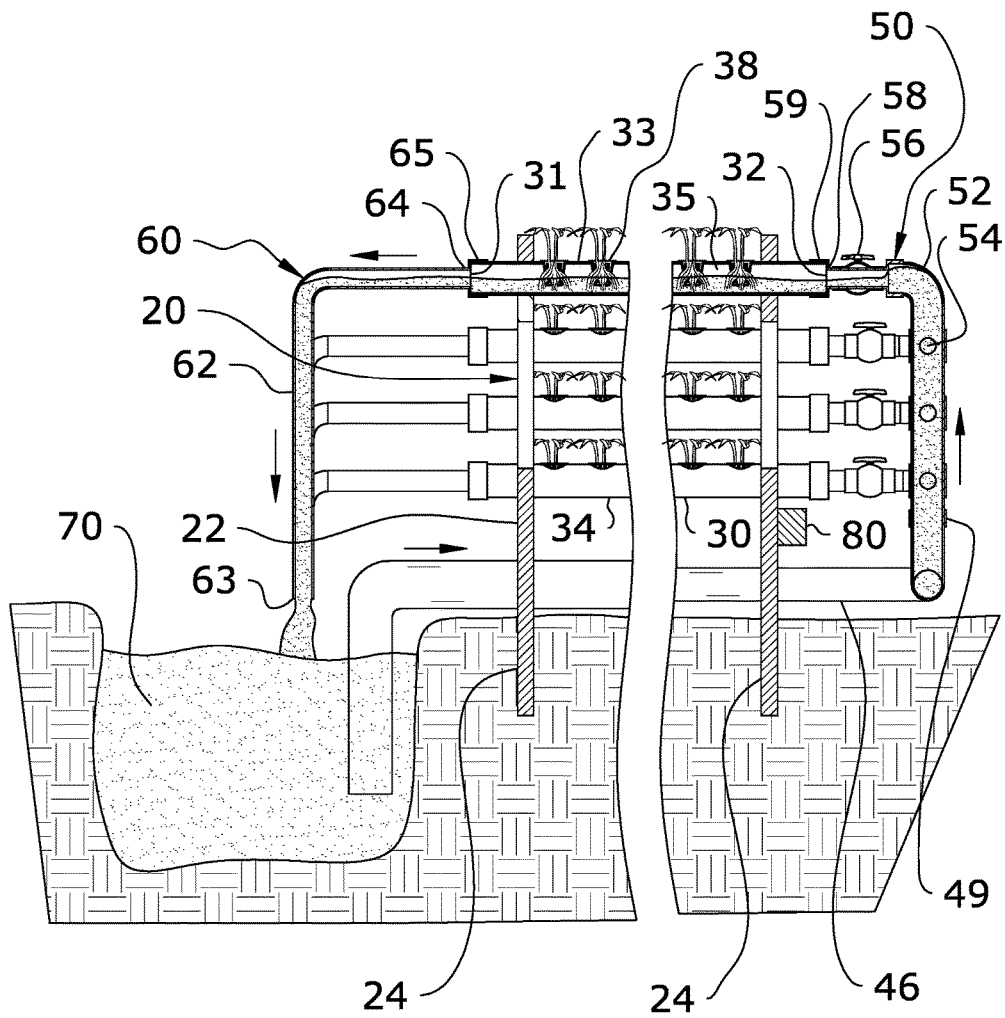
FIG. 12 is a side sectional view of the present invention illustrating fluid flow.

As shown in FIGS. 8 and 9, the growing pipes 30 may comprise a plurality of openings 36 in which plants can grow. The size and spacing of the openings 36 is selected depending on the size of the growing pipes 30 and the type of crop that will be grown. The plants may be placed in planters 38 that vary in size depending on the size of the openings 36 but may be 3.75 inches in diameter. The planters 38 may be net cups or pots comprised of plastic or other suitable materials and perforated on the sides and bottom to allow water to flow through. The planters 38 may be smaller than the openings 36, which leaves room around the planters 38 for water to flow. The planters 38 may contain rocks and/or fertilizer, such as worm casting.

Figure 13:
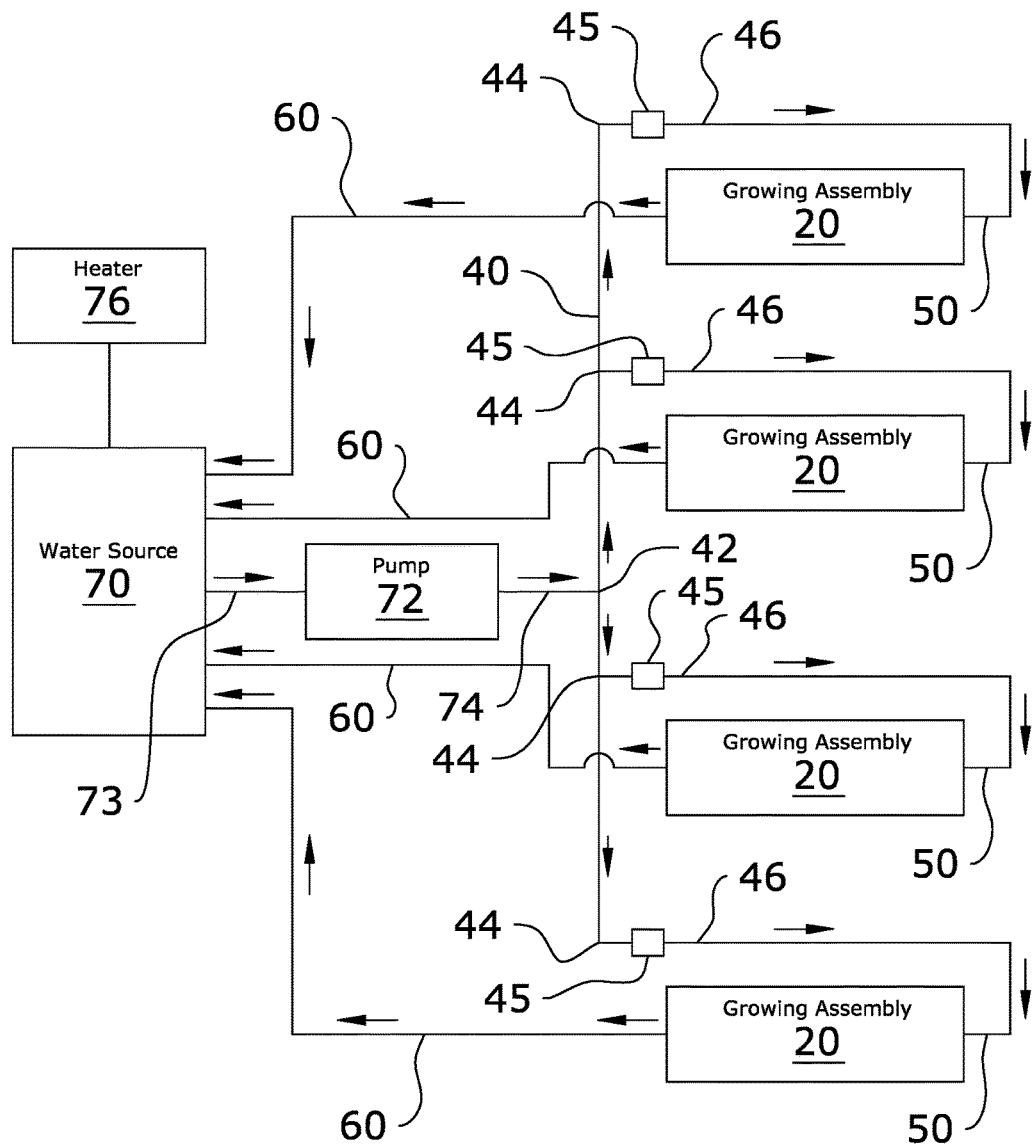
FIG. 13 is a block diagram of the present invention illustrating fluid flow.
Figure 14:
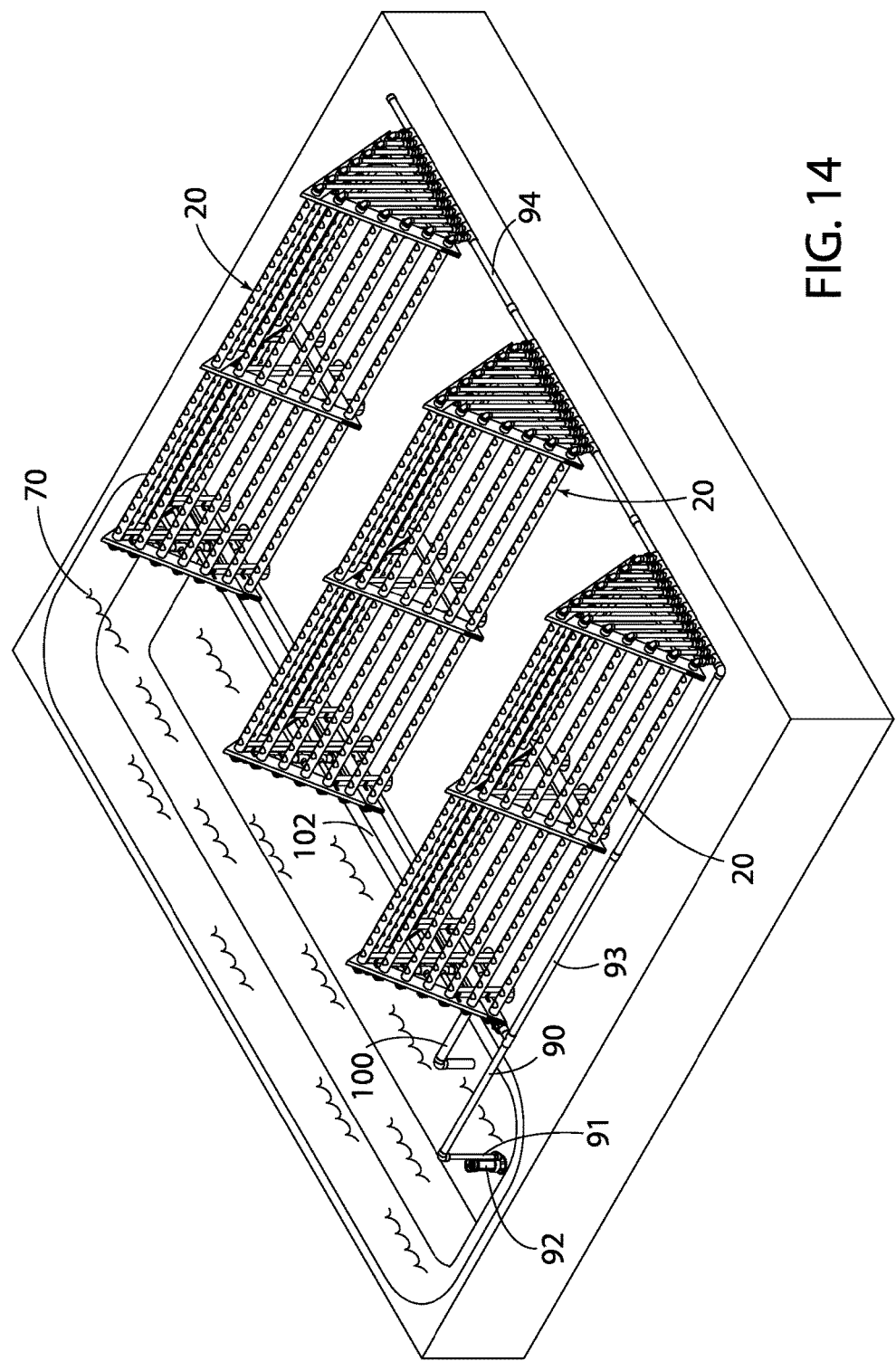
FIG. 14 is an upper perspective view of a growing system in accordance with an example embodiment.

Referring now to FIGS. 1 and 13, a single fluid source 70 feeds the entire growing system 10 and is capable of feeding multiple growing assemblies 20 simultaneously. The fluid source 70 may be any container suitable for holding water or growth medium, such as water with liquid fertilizer. In one embodiment, the fluid source 70 may be a hole dug into the ground which may be lined with a pond liner (not shown) to help retain water.

Figure 7:
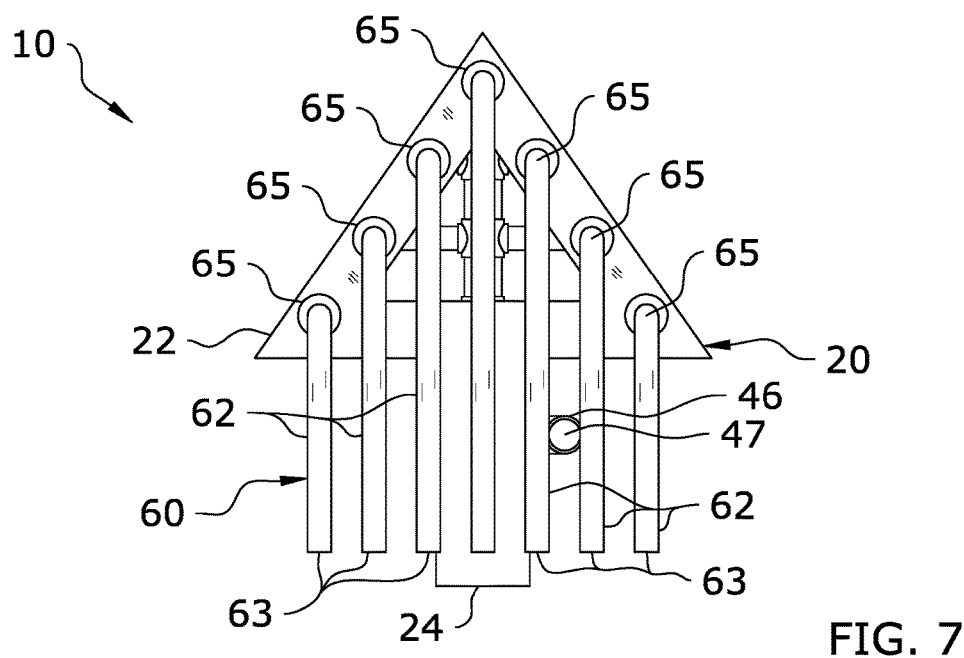
FIG. 7 is a front view of a growing assembly of the present invention.

The fluid from the fluid source 70 is pumped through a main manifold 40, which may be 2- or 3-inch PVC pipe, to feed a plurality of feeder pipes 46 which feed the various growing assemblies 20. The fluid then flows back through the growing assemblies 20 in the direction of the fluid source 70 by force of a single pump 72. Any excess fluid in the growing assemblies 20 returns back to the fluid source 70 via one or more drain pipes 62 which may, in some embodiments, be configured into a drainage device 60 which is attached to the growing pipes 30 as shown in FIG. 7.

The drain pipes 62 are preferably of a smaller diameter than the growing pipes 30 and may comprise a 50% reduction in diameter size compared to the growing pipes 30. The fluid source 70 is preferably placed as close as possible to the growing system 10. Its size is selected depending on the number of growing pipes 20 and the number of growing assemblies 20 it will feed.

As illustrated in FIG. 13, a pump 72 is placed in fluid communication with the fluid source 70. The pump 72 may be a 3-horsepower sewage lift pump or other suitable pump 72 which may have a pump rate at least up to 13,000 gallons per hour. A pump rate of 13,000 gallons per hour is capable of supplying water simultaneously to at least three growing assemblies 20. The pump 72 moves the water to a main manifold 40, preferably made of 6-inch round pipe and containing manifold valves 45 that evenly disperse the fluid to each growing assembly 20. The fluid entering each growing assembly 20 from the main manifold 40 is dispersed through the feeder pipes 46 to control the flow of water through each rigid growing pipe 30 as described above. Each growing assembly 20 contains its own feeder pipe 46. Multiple growing assemblies 20 can be disposed in adjacent north-south configurations with a common fluid source 70 and pump 72, with the excess fluid from each growing assembly 20 returning to the fluid source 70. FIG. 13 further illustrates the direction of flow of water through each growing assembly 20.

In other embodiments, sealed electrical heat trace cables 39 can be run through each of the growing pipes 30 to be used in the colder months to help prolong growing seasons such as shown in FIGS. 8 and 9. A pond heater 76 can be used in the fluid source 70 to also help prolong growing seasons. The fluid exiting the drain pipes 62 may be dispersed in a controlled manner to a plurality of trays (not shown) suspended over the fluid source 70, with each tray also having a drain to return water back to the fluid source 70. The trays are of an appropriate size to span across the reservoir 20, and in one embodiment may be 4 feet wide×8 feet long. The trays can be filled with an appropriate amount of fluid, preferably 3-4 inches of water, to start plants for the growing system 10.

In further embodiments, probes 82 can be placed at various positions within and around the system to monitor parameters such as watering (pressure, flow rate, volume), temperature, light exposure, nutrient levels, growth rate, etc. Such probes 82 can transmit data regarding the various parameters to a remote location via control unit 80 such as a computer to be evaluated manually or may be automatically transmitted to the control unit 80, which can adjust various devices (such as manifold valves 45 and/or control valves 56), including turning them on or oft in response to the data received from the probes 82. Such automation can be valuable for monitoring and controlling multiple growing assemblies 20 for large-scale farming.

Although exemplary embodiments are presented in order to better describe and illustrate the invention, it should be noted that the invention is not limited to only those exemplary embodiments. Although the invention has been described with respect to various embodiments, it should be realized that the invention is also capable of a wide variety of further and other embodiments within the spirit and scope of these teachings.

B. Growing Assemblies

As best shown in FIGS. 1 and 13, the present invention comprises a plurality of growing assemblies 20 which are fed from a single fluid source 70 by a single pump 72. The growing assemblies 20 may be oriented in various configurations, and thus should not be construed as limited to the orientation shown in the figures. While the growing assemblies 20 are preferably positioned near the fluid source 70 as shown in the figures, it should be appreciated that in some embodiments, one or more of the growing assemblies 20 may be positioned any distance from the fluid source 70.

The growing assemblies 20 may comprise various configurations known in the art to efficiently grow plants or other crops. In a preferred embodiment as shown in the figures, the growing assemblies 20 each comprise a triangular configuration to maximize sunlight exposure to each of the planters 38. In such an embodiment, each of the growing assemblies 20 comprise an inlet manifold 50, a drainage device 60, and a plurality of growing pipes 30 extending between the inlet manifold 50 and the drainage device 60. Each inlet manifold 50 is separately fed fluids from its own feeder pipe 46; with the feeder pipes 46 each being separately connected to a single main manifold 40. The main manifold 40 is connected to a pump outlet 74 to receive fluids from the fluid source 70.

Each growing assembly 20 may comprise one or more frames 22. In the embodiment shown in the figures, each of the frames 22 comprises a triangular configuration, though other configurations may be utilized. The frames 22 include a plurality of receivers 23, typically comprising openings or ports formed within the frames 22, which are adapted to removably receive and retain the growing pipes 30. Each of the frames 22 may also include a stand 24 which rests or is driven into the ground surface to retain the frames 22 in an upright configuration.

As best shown in FIG. 8, each of the growing assemblies 20 includes a plurality of growing pipes 30. The growing pipes 30 will generally comprise elongated, rigid pipe structures having a first end 31, a second end 32, an upper end 33, and a lower end 34. A channel 35 extends through each of the growing pipes 30 between their respective first and second ends 31, 32. A plurality of openings 36 formed in the upper end 33 of the growing pipes 30 to removably receive one or more planters 38 as discussed herein. Thus, each of the growing pipes 30 will generally include a row of openings 36 extending across its upper end 33 between its first end 31 and its second end 32. As mentioned previously, one or more of the growing pipes 30 may also include heat trace cables 39 to elongate the growing season in colder climates.

Figure 4:
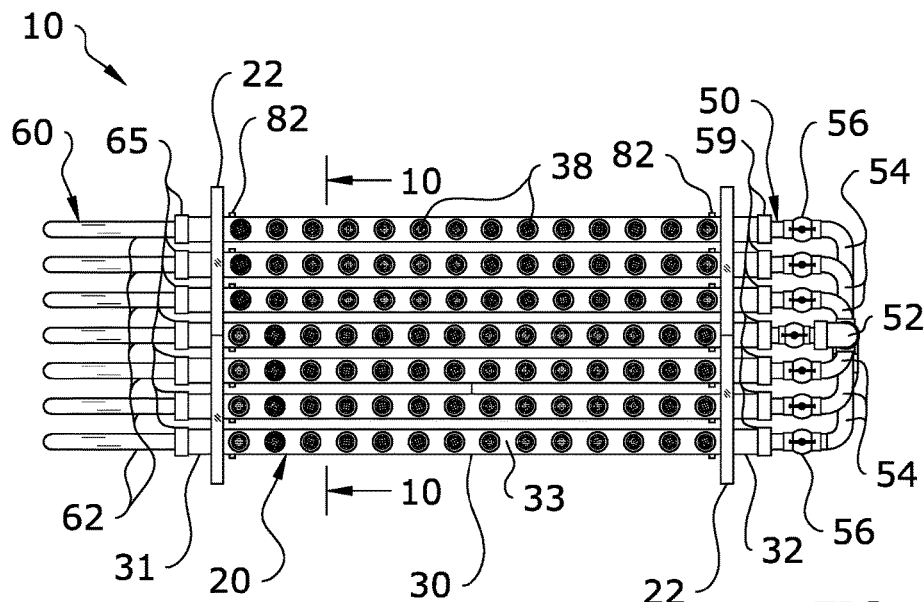
FIG. 4 is a top view of a growing assembly of the present invention.
Figure 5:
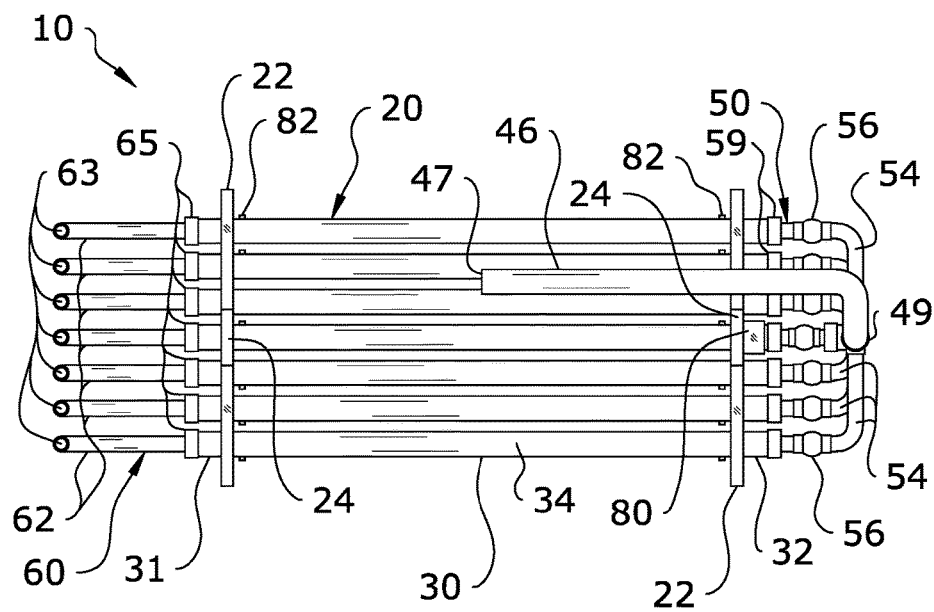
FIG. 5 is a bottom view of a growing assembly of the present invention.

As shown in FIG. 4, each of the growing pipes 30 are each connected at a first end 31 to a drain pipe 62 and at a second end 32 to an inlet pipe 52. Thus, a plurality of inlet pipes 52 feed fluid into the growing pipes 30 and a plurality of drain pipes 62 discharge fluids from the growing pipes 30. In a preferred embodiment, the plurality of inlet pipes 52 are configured to form an inlet manifold 50 and the plurality of drain pipes 62 are configured to form a drainage device 60.

Figure 3:
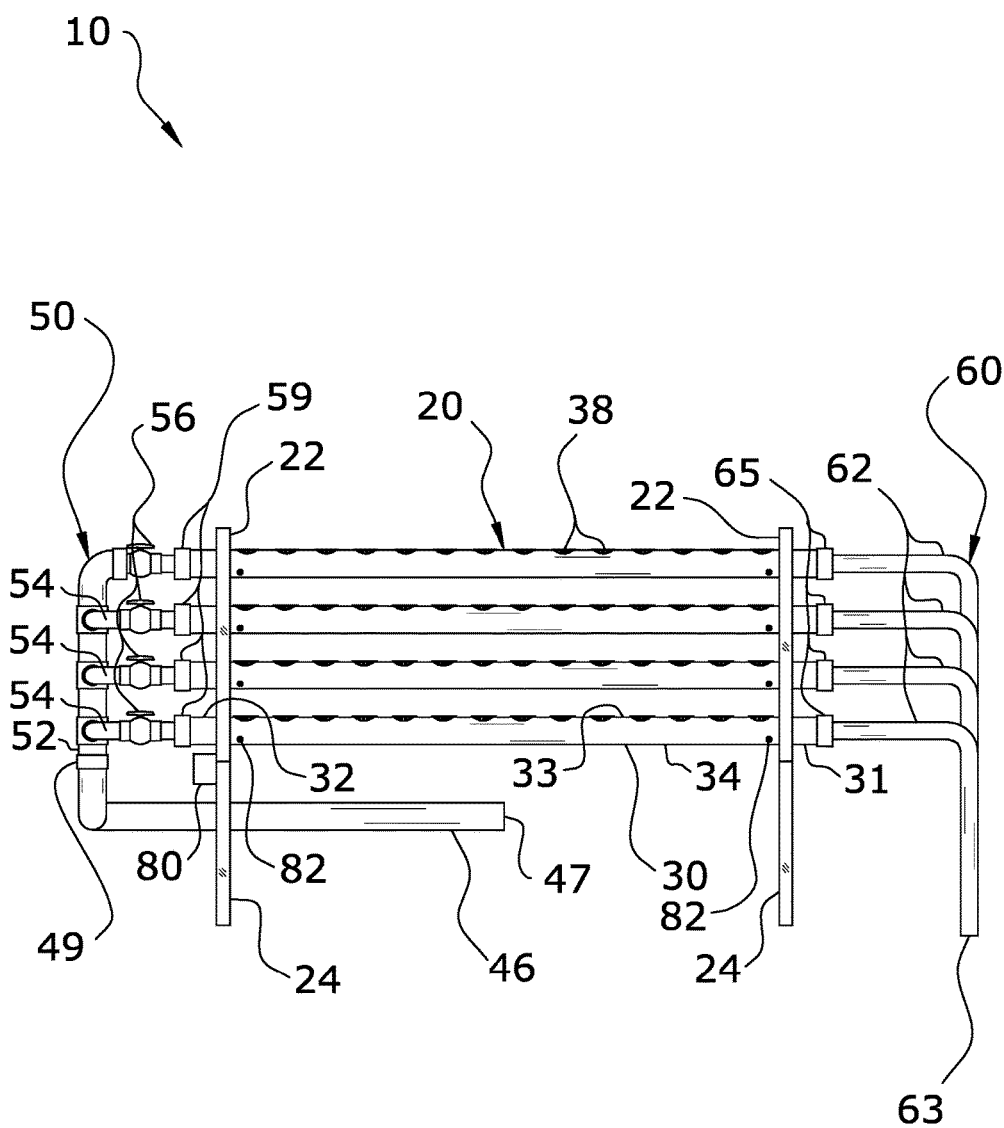
FIG. 3 is a second side view of a growing assembly of the present invention.
Figure 6:
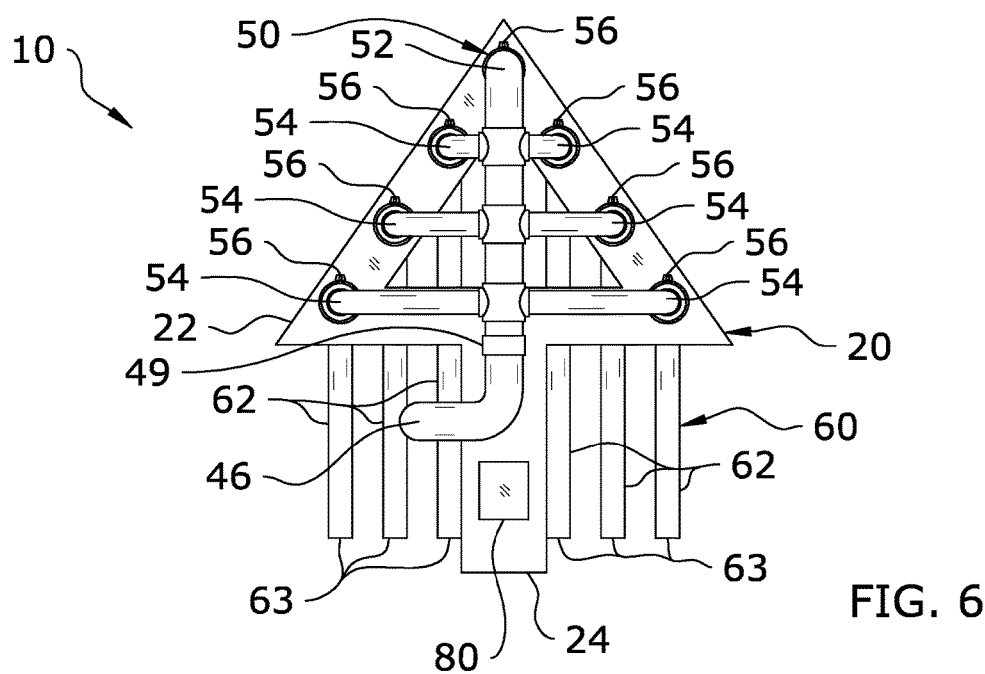
FIG. 6 is a rear view of a growing assembly of the present invention.

FIG. 6 best illustrates an inlet manifold 50 of a growing assembly 20 of the present invention. The inlet manifold 50 is generally positioned at an inlet end of each of the growing assemblies 20. As shown, the inlet manifold 50 will generally comprise an inlet pipe 52 and a plurality of pipe reducers 54 extending in various directions off of the inlet pipe 52. The number of pipe reducers 54 will be the same as the number of growing pipes 30 in the growing assembly 20; with each of the pipe reducers 54 being connected to feed its own growing pipe 30. As shown in FIG. 3, the growing pipes 30 may extend through the receivers 23 of the frame 22 of the growing assembly 20.

Control valves 56 may be positioned between the pipe reducers 54 and the growing pipes 30 so as to control the flow of fluids therethrough. The control valves 56 may also be positioned in-line with the pipe reducers 54. Each of the pipe reducers 54 may include an outlet 58 which is connected to the second end 32 of each of the growing pipes 30, such as by an outlet coupler 59. The outlet coupler 59 can serve to reduce the time necessary for connecting or disconnecting the growing pipes 30 and the inlet pipes 52. The pipe reducers 54 are generally comprised of a smaller diameter than the inlet pipe 52 so as to restrict and control flow of fluids therethrough prior to entering the growing pipes 30 at their respective second ends 32.

FIG. 7 best illustrates a drainage device 60 of a growing assembly 20 of the present invention. As shown, the drainage device 60 will generally comprise a plurality of drain pipes 62 positioned at an outlet end of the growing assemblies 20. The drain pipes 62 need not be interconnected in any way, though they may each be arranged to connect through the receivers 23 of the frame 22 of the growing assembly 20.

Each of the drain pipes 62 of the drainage device 60 comprises a first end 63 and a second end 64. The first ends 63 of each of the drain pipes 62 serve as an outlet for the drain pipes 62 and thus are positioned over the fluid source 70 so that fluids exiting through the first ends 63 of the drain pipes 62 flows directly into the fluid source 70 for re-use. The second ends 64 of the drain pipes 62 are each connected to a first end 31 of a growing pipe 30, such as through use of a drainage coupler 65. The use of a drainage coupler 65 can reduce time necessary for connecting or disconnecting the drain pipes 62 to/from the growing pipes 30. To control flow, the diameter of the drain pipes 62 will preferably be smaller than the diameter of the growing pipes 30 to which they are connected.

C. Manifold and Feeder Pipes

As best shown in FIGS. 1 and 13, the present invention utilizes a single main manifold 40 which receives fluids from the fluid source 70 via a single pump 72 and splits into multiple flows of the fluid; each going through a respective feeder pipe 46 to reach each respective growing assembly 20. By using the main manifold 40 and feeder pipes 46, a single fluid source 70 can feed a plurality of growing assemblies 20 using only a single pump 72. In a preferred embodiment, the main manifold 40 extends beneath all of the plurality of growing assemblies 20 of the present invention.

The main manifold 40 of the present invention is best shown in FIG. 1. As shown, the main manifold 40 will generally comprise an elongated, rigid pipe which extends perpendicular with respect to the growing assemblies 20 (i.e., the orientation of the main manifold 40 is generally perpendicular with respect to the orientation of the growing pipes 30 of each growing assembly 20). However, other configurations and orientations may be utilized in different embodiments of the present invention. The main manifold 40 may be positioned at various distances from the fluid source 70, but will preferably be near the fluid source 70 to improve water pressure and reduce the amount of piping needed.

The main manifold 40 includes an inlet 42 and a plurality of outlets 44. The inlet 42 of the main manifold 40 is fed fluid from the pump 72. Thus, the inlet 42 of the main manifold 40 is generally fluidly connected with the pump outlet 74 as shown in FIG. 13. The outlets 44 of the main manifold 40 are fluidly connected to a plurality of feeder pipes 46. Preferably, a plurality of manifold valves 45 are provided to control flow at each of the outlets 44. The manifold valves 45 may be connected at the juncture of the outlets 44 of the main manifold 40 and the first ends 47 of the feeder pipes 46. Alternatively, the manifold valves 45 could be in-line on the feeder pipes 46. In any case, the use of manifold valves 45 will enable an operator of the present invention to selectively restrict flow to one or more of the growing assemblies 20. A control unit 80 may also be provided which can be utilized to control the manifold valves 45 automatically or in response to an input.

Each growing assembly 20 of the present invention receives its fluids from one of the feeder pipes 46 extending from the main manifold 40. The first end 47 of each feeder pipe 46 is thus fluidly connected to an outlet 44 of the main manifold 40. The second end 48 of each feeder pipe 46 is fluidly connected with an inlet manifold 50 of a growing assembly 20. More specifically, the second end 48 of each feeder pipe 46 is generally connected to the inlet pipe 52 of the inlet manifold 50 of each growing assembly 20.

D. Fluid Source and Pump

The plurality of growing assemblies 20 of the present invention are all fed by a single fluid source 70 through use of a single pump 72. The use of pipes, rather than tubing, for all fluid flow components of the present invention allows such a configuration to be possible as mentioned previously.

The figures illustrate the fluid source 70 as comprising a ground reservoir. However, this exemplary embodiment should not be construed as limiting on the scope of the present invention. Any fluid source 70 may be utilized so long as it contains an adequate volume of fluids for continuous use of the present invention. For example, the fluid source 70 in some embodiments may comprise an above-ground or below-ground container. In other embodiments, the fluid source 70 could comprise a water main or other type of water-transferring conduit.

It should also be appreciated that any type of fluid may be utilized with the present invention, and thus its scope should not construed as limited to water or any other specific type of fluid. In some cases, a mixture of fluid and particulate material, such as fluid and a growing aid such as fertilizer (liquid or solid), may be utilized for the present invention.

Various types of pumps 72 may be utilized with the present invention so long as the proper pumping force is provided. It is noted that the strength of the pump 72 utilized will vary depending on how many growing assemblies 20 are being used with the present invention. As more growing assemblies 20 are added to the system, a higher strength pump 72 will be necessary.

The pump 72 is preferably positioned near the fluid source 70, with the pump inlet 73 being fluidly connected directly to the fluid source 70 to draw fluids up into the pump 72. The pump outlet 74 is connected to the main manifold 40 to be further distributed to the growing assemblies 20 via the feeder pipes 46. A separate heater 76 may be provided as well, or integrated with the pump 72, to warm the fluids stored in the fluid source 70. Use of such a heater 76 may increase growing time in colder climates. The heater 76 may be controlled by the control unit 80, or be manually controlled by hand.

E. Operation of Preferred Embodiment

FIG. 13 illustrates the interconnection of the various components of the present invention. In use, the system is first set up. Preferably, the present invention will be set up near an existing fluid source 70 such as a reservoir. Alternatively, a separate fluid source 70 may be set up or provided by the operator of the present invention, such as by installing a container such as a tank. In any case, after ensuring availability of a fluid source 70, the present invention may be installed for use.

The pump 72 is positioned near the fluid source 70, with the pump inlet 73 being fluidly connected to the fluid source 70. The pump outlet 74 is connected to a main manifold 40 that is set up near the fluid source 70. After installation of the pump 72 and main manifold 40, one or more growing assemblies 20 may be connected to the system.

Each growing assembly 20 is installed by first connecting a feeder pipe 46 to the main manifold 40. Generally, one feeder pipe 46 will be utilized for each growing assembly 20, though in some embodiments multiple growing assemblies 20 could share one feeder pipe 46. The feeder pipes 46 may be connected to the main manifold 40 so that the feeder pipe 46 extends perpendicularly with respect to the main manifold 40 as shown in the figures, or other orientations may be utilized.

The outlet of the feeder pipes 46, generally comprised of their second ends 48, will be connected to the inlet manifold 50 of the growing assemblies 20 being installed. Any number of growing assemblies 20 may be supported by the present invention. Generally, the second end 48 of each feeder pipe 46 is connected to an inlet pipe 52 of each growing assembly 20. As discussed previously, the growing pipes 30 connect to a plurality of pipe reducers 54 which extend from the inlet pipe 52. A plurality of planters 38 are positioned within the openings 36 of the growing pipes 30, with any type of plant or crop being grown within the planters 38. The drain pipes 62 are connected to the growing pipes 30 such that fluids discharged from each growing assembly 20 are fed back into the fluid source 70 for further use.

FIG. 13 provides an exemplary illustration of fluid flow in the present invention. As shown there, fluids from the fluid source 70 are drawn via the pump 72 into the main manifold 40. The main manifold 40 distributes the fluids to a plurality of feeder pipes 46; with each feeder pipe 46 being connected to one of the growing assemblies 20. Fluid will flow through the inlet manifold 50 of each growing assembly 20, through the growing pipes 30 to provide fluids to the planters 38, and exit through the drainage device 60 to be discharged into the same fluid source 70 that the fluids were drawn from.

The manifold valves 45 may be manipulated to control fluid flow to one or more of the growing assemblies 20. For example, if one of the growing assemblies 20 ceases functioning (such as due to a blockage at some location in the system), that particular growing assembly 20 may be shut off via one of the manifold valves 45 without affecting operation of the other growing assemblies 20 during service.

The control valves 56 at the inlet manifolds 50 of each growing assembly 20 may also be utilized to control flow rate. For example, different growing assemblies 20 within the same system of the present invention may house different crops. Because different types of plants require different watering schedules and amounts, the control valves 56 at the inlet manifolds 50 may be manipulated so that less fluid flows into a first growing assembly 20 growing a first crop while more fluid flows into a second growing assembly 20 growing a second crop. The control unit 80 may be utilized to automate this process and the probes 82 may be utilized to monitor the overall functionality of the system as a whole.

F. Alternate Embodiment

FIGS. 14-21 illustrate an alternate embodiment of a growing system 10 in which an inlet conduit 90 draws from a fluid source 70 utilizing a pump 92 which is submerged in the fluid source 70. The pump 92 could comprise any mechanism, device, or system known to pump fluids from a fluid source 70, such as a submersible shredder sewage pump. The pump 92 could include a filter to filter fluids being pulled from the fluid source 70.

Each of the growing assemblies 20 is fed fluid by the inlet conduit 90. In the exemplary embodiment shown in FIGS. 14-16, three growing assemblies 20 are positioned in a row. It should be appreciated that more or less growing assemblies 20 could be utilized depending on the particular application and the volume of the fluid source 70.

Figure 15:
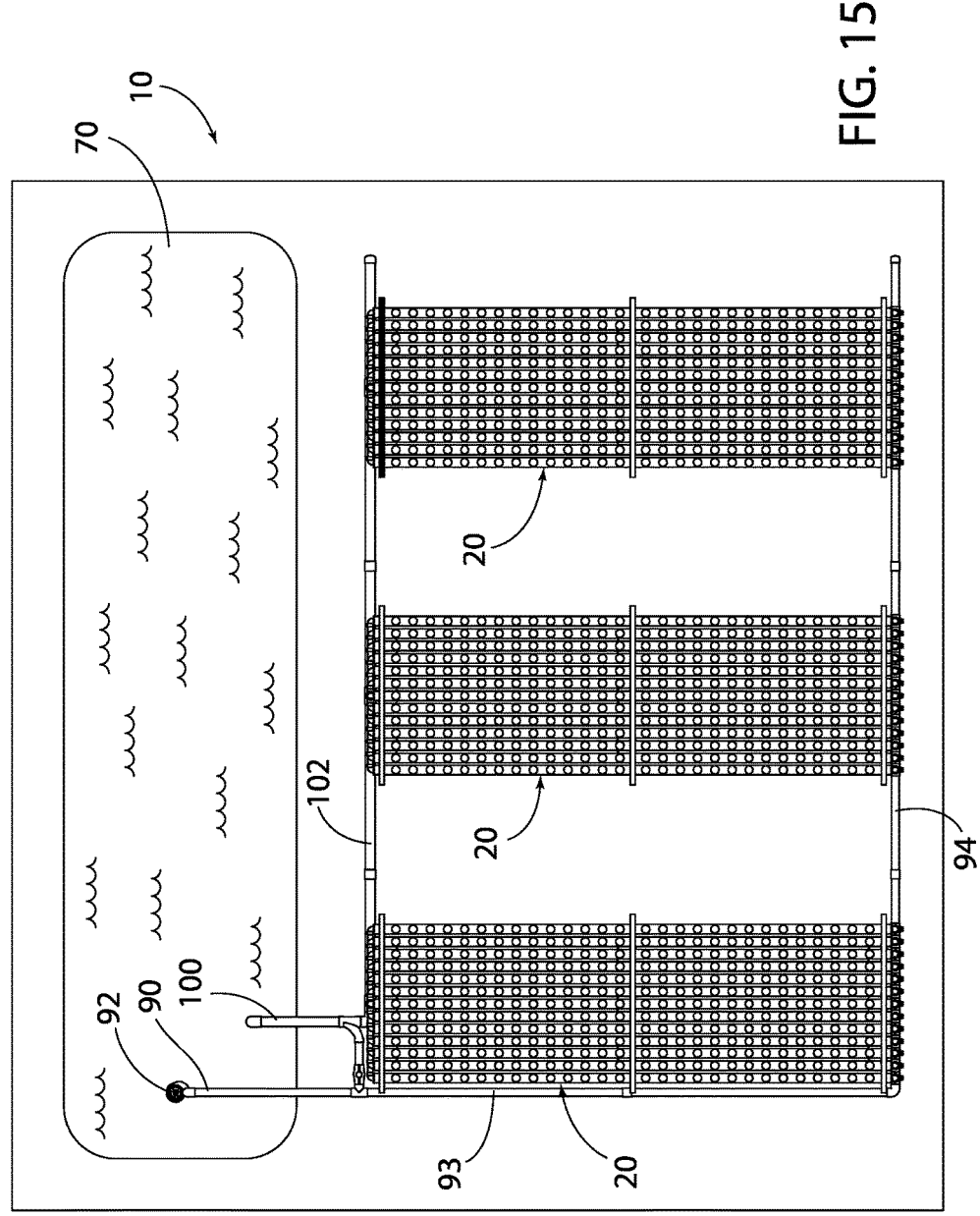
FIG. 15 is a top view of a growing system in accordance with an example embodiment.

As shown in FIG. 15, the inlet conduit 90 comprises a first section 93 extending in a first direction along the length of a growing assembly 20. A second section 94 of the inlet conduit 90 extends in a second direction at a right angle with respect to the first section 93. In this manner, the second section 94 of the inlet conduit 90 may extend across the rear ends of the growing assemblies 20 to feed fluid from the fluid source 70 to the growing assemblies 20 via their inlet hubs 50. It should be appreciated that alternate routing could be utilized for the inlet conduit 90 in certain embodiments to accommodate different layouts of growing assemblies 20.

Figure 16:
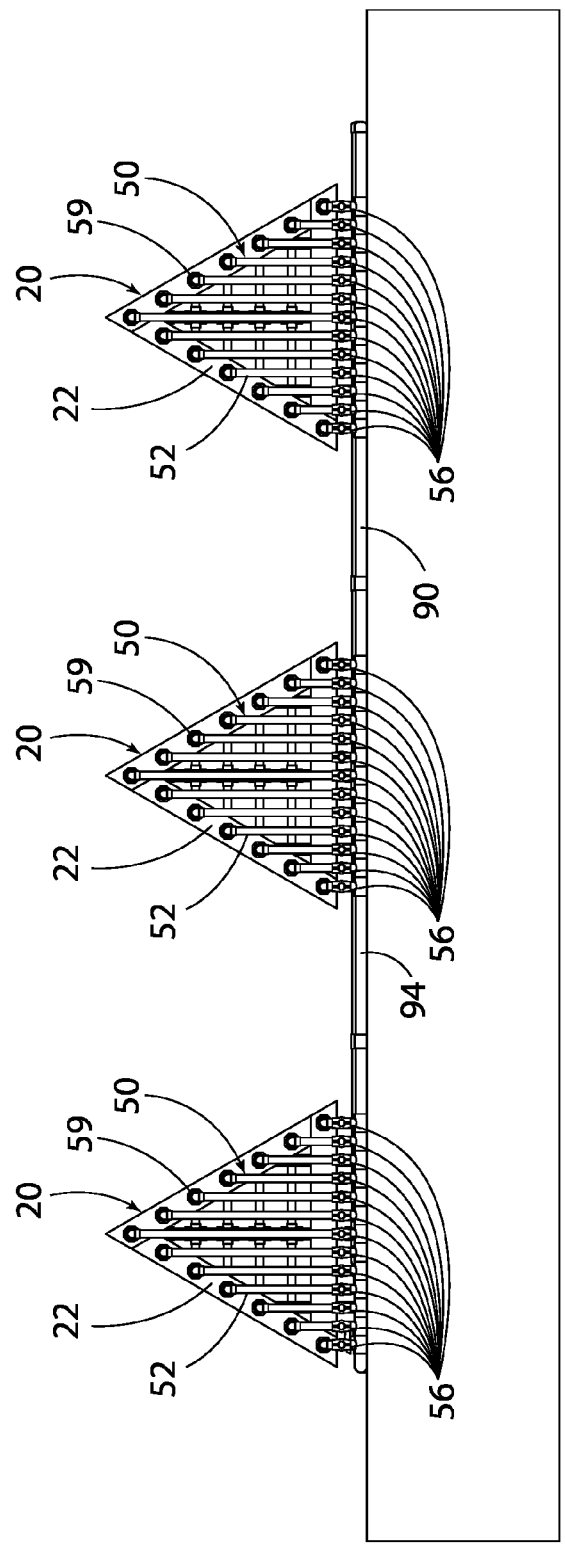
FIG. 16 is a first end view of a growing system in accordance with an example embodiment.
Figure 17:
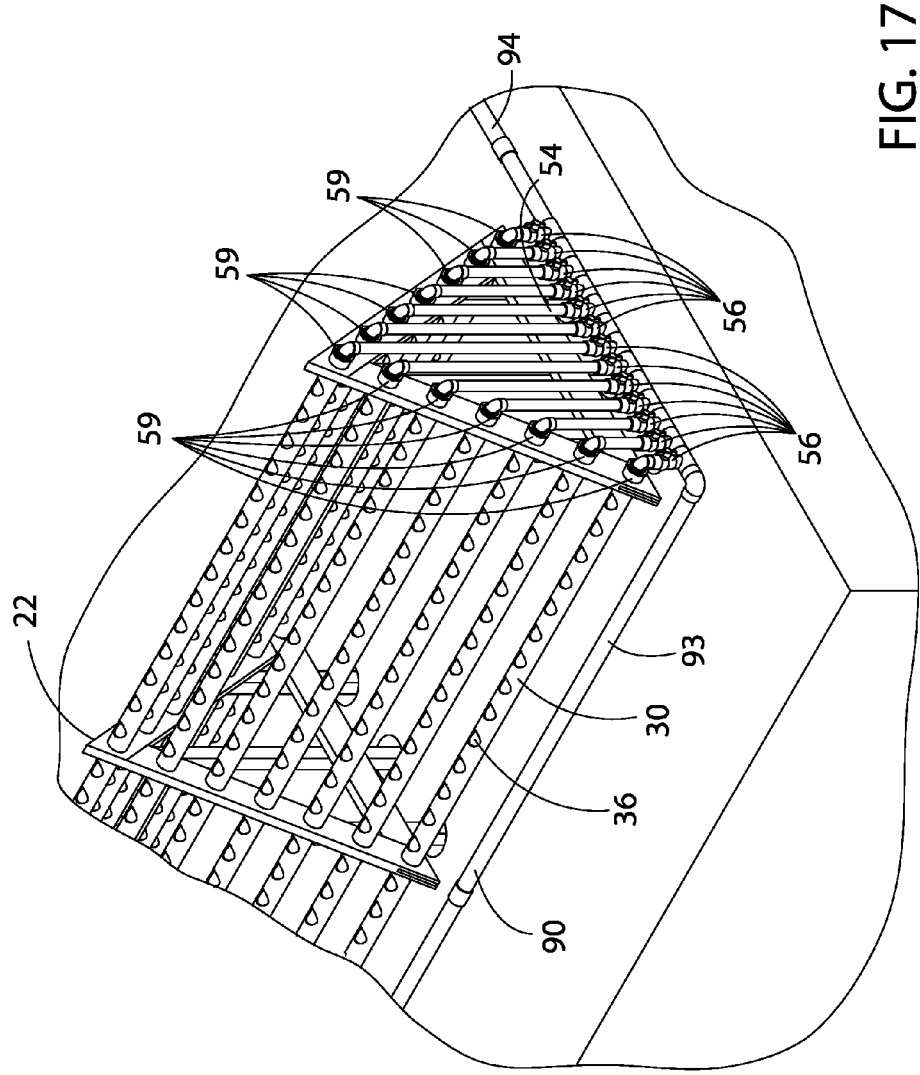
FIG. 17 is an upper perspective view of the outlet side of a growing assembly of a growing system in accordance with an example embodiment.

The fluid may pass through the growing assemblies 20 as discussed previously. As shown in FIGS. 16-17, each growing assembly 20 may include an inlet hub 50 which receives the fluid from the inlet conduit 90 and distributes the fluid through each growing pipe 30 of that particular growing assembly 20.

Figure 18:
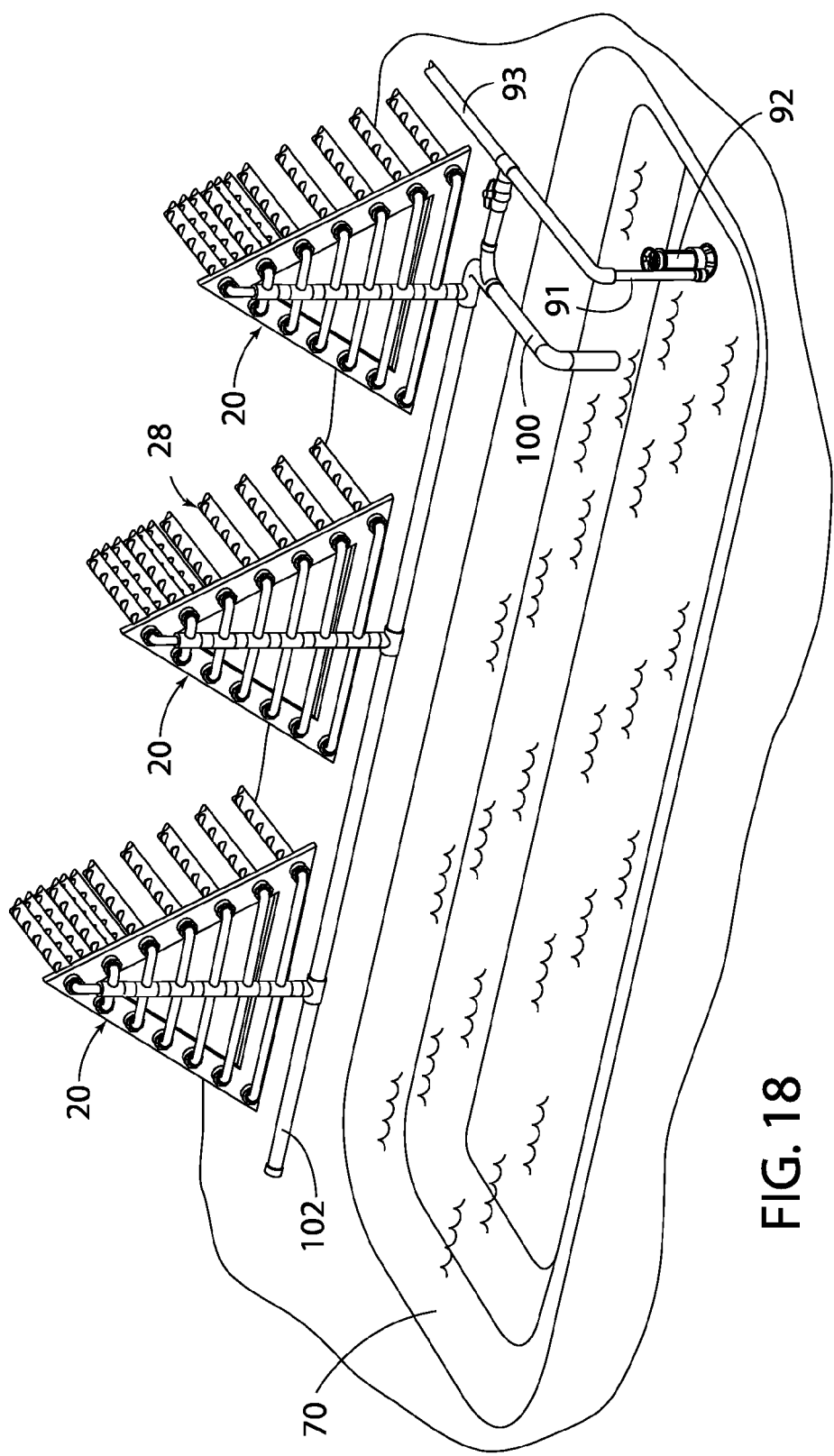
FIG. 18 is an end view of a growing system in accordance with an example embodiment.

As shown in FIGS. 16-17, the inlet hub 50 may comprise a plurality of inlet pipes 52 which are each fluidly connected to the inlet conduit 90 by a control valve 56. By having a control valve 56 on each inlet pipe 52 of the inlet hub 50, individual growing pipes 30 may be shut off for service or the like without impacting operation of the overall growing system 10. Pipe reducers 54 and outlet couplers 59 may also be utilized as discussed previously. As shown in FIG. 18, each growing assembly 20 may include a drainage hub 60 through which the fluid will exit the growing assemblies 20 to enter the outlet conduit 100 to be returned to the fluid source 70. The drainage hubs 60 are illustrated as each comprising a central drainage pipe 67 which is connected to an outlet manifold 102. Drainage connectors 68 comprising conduits are connected between the outlets of the growing pipes 30; with each drainage connector 68 feeding fluid from a growing pipe 30 to the central drainage pipe 67.

Figure 21:
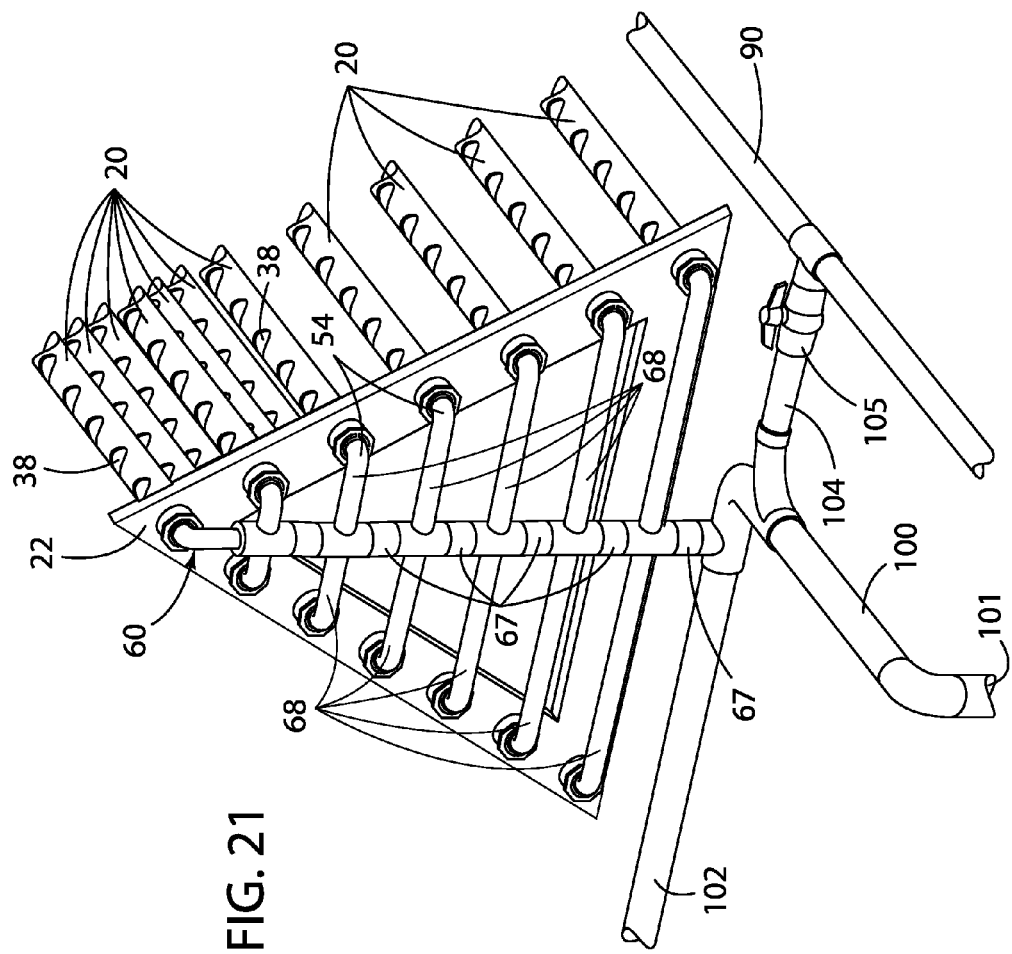
FIG. 21 is an upper perspective view of a growing system in accordance with an example embodiment.

As shown in FIG. 18, each growing assembly 20 of the growing system 10 feeds into an outlet manifold 102 which extends across outlet side of the growing assemblies 20. As seen in FIG. 18, the outlet manifold 102 may extend in parallel with respect to the second section 92 of the inlet conduit 90. The outlet manifold 102 is fluidly connected to an outlet conduit 100 which provides an outlet 101 for the fluid over the fluid source 70 such as shown in FIG. 18. As shown in FIG. 21, a backflow connector 104 may be connected between the inlet conduit 90 and the outlet conduit 100. The backflow connector 104 may include a backflow valve 105 which may be selectively opened or closed.

Figure 19:
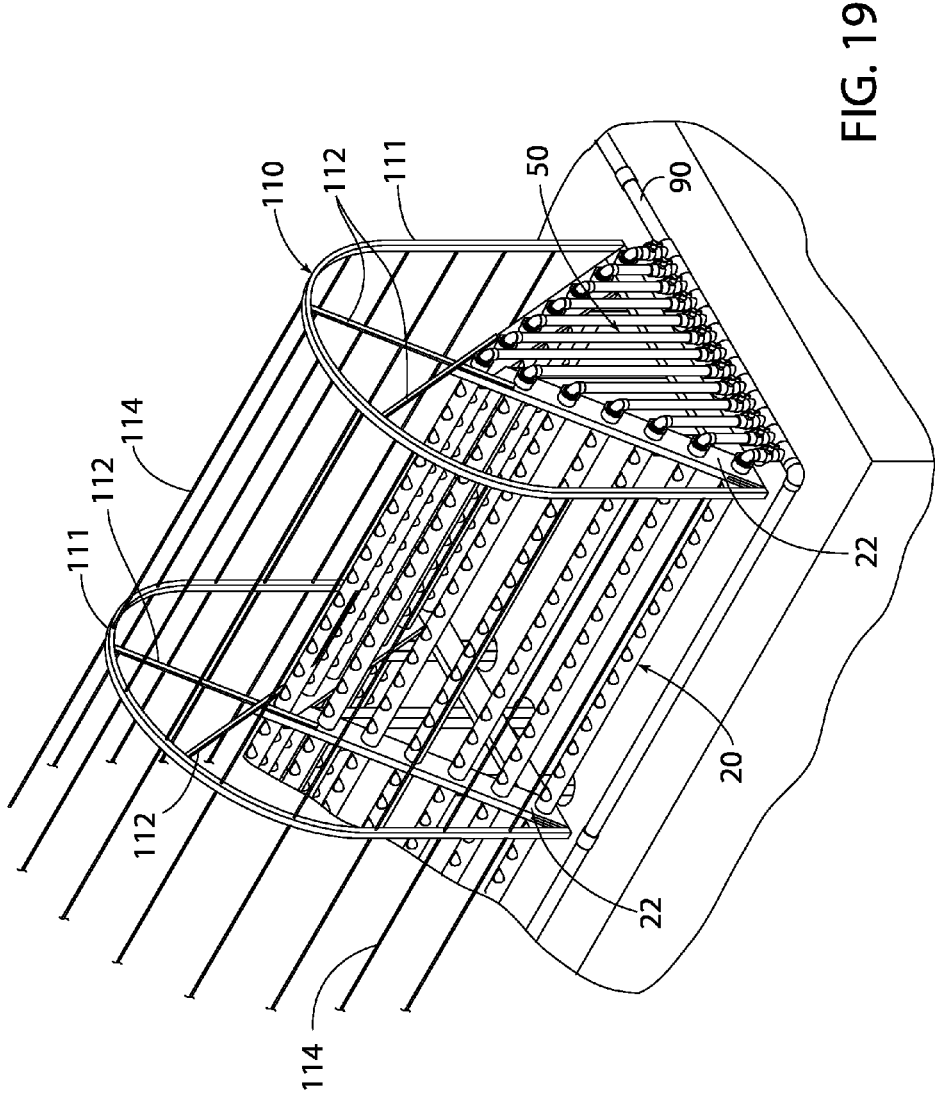
FIG. 19 is an upper perspective view of the inlet side of a growing assembly of a growing system in accordance with an example embodiment.
Figure 20:
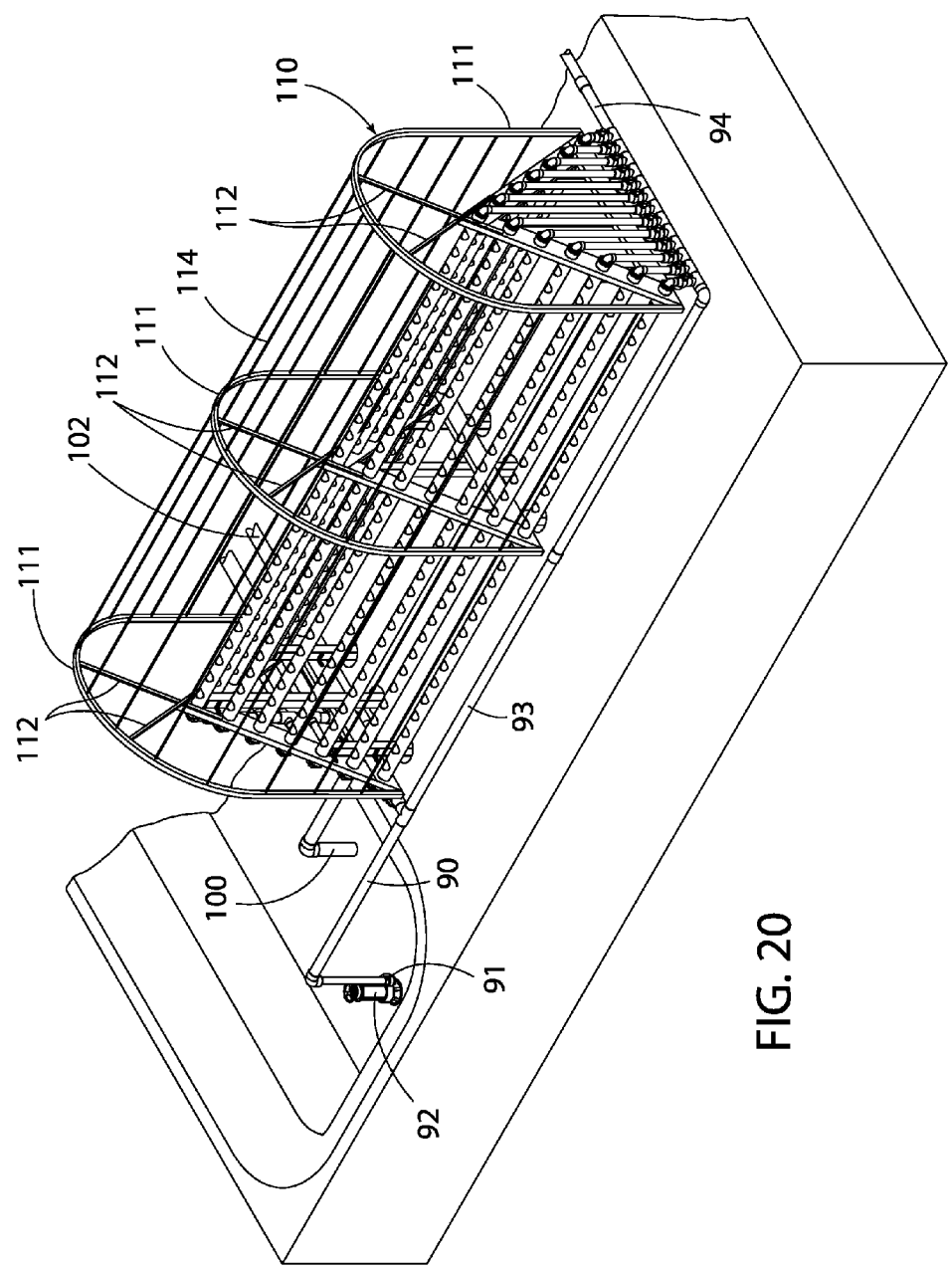
FIG. 20 is an upper perspective view of a growing system in accordance with an example embodiment.

FIGS. 19-20 illustrate an embodiment of the growing system 10 in which the growing assemblies 20 may each include plant supports 110 for supporting growing plants such as vines. The plant supports 110 may each comprise inverted U-shaped end frames 110 which are connected to the frames 23 of the growing assemblies 20 by stabilizers 112. Support lines 114 extend horizontally between the end frames 111 over the growing pipes 30. Plants from the growing pipes 30 may latch onto the support lines 114, such as tomatoes or other vining plants.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A growing system, comprising:
an inlet conduit fluidly connected to a fluid source;
a pump for feeding a fluid from the fluid source to the inlet conduit;
a growing assembly comprising a plurality of growing pipes for growing plants, wherein the growing assembly is fluidly connected to the inlet conduit such that the fluid passes through the growing assembly, wherein the growing assembly includes a plant support for supporting the plants grown in the growing pipes, wherein the plant support comprises a plurality of end frames and a plurality of support lines extending between the end frames; and
an outlet conduit fluidly connected to the growing assembly, wherein the outlet conduit is positioned so as to dispense fluids from the growing assembly back into the fluid source.

2. The growing system of claim 1, wherein the growing assembly comprises an outlet end and an inlet end.

3. The growing system of claim 2, wherein the inlet conduit extends alongside the growing assembly from the outlet end to the inlet end.

4. The growing system of claim 1, wherein the growing assembly comprises an inlet hub fluidly connected to the inlet conduit.

5. The growing system of claim 4, wherein the inlet hub comprises a plurality of inlet pipes connected between the inlet conduit and each of the growing pipes of the growing assembly.

6. The growing system of claim 5, wherein the growing assembly comprises a drainage hub connected to the outlet conduit.

7. The growing system of claim 6, wherein the drainage hub comprises a central drainage pipe which is fluidly connected between the outlet conduit and each of the plurality of growing pipes of the growing assembly.

8. The growing system of claim 7, further comprising a plurality of drainage connectors each being connected between one of the growing pipes of the growing assembly and the central drainage pipe of the drainage hub.

9. The growing system of claim 1, wherein each of the support lines extends above one of the plurality of growing pipes.

10. A growing system, comprising:
   an inlet conduit fluidly connected to a fluid source;
   a pump for feeding a fluid from the fluid source to the inlet conduit;
   a plurality of growing assemblies each comprising a plurality of growing pipes for growing plants, wherein each of the growing assemblies is fluidly connected to the inlet conduit such that the fluid passes through the growing assemblies;
   an outlet conduit fluidly connected to each of the growing assemblies, wherein the outlet conduit is positioned so as to dispense fluids from the growing assemblies back into the fluid source; and
   a backflow connector fluidly connected between the outlet conduit and the inlet conduit.

11. The growing system of claim 10, wherein the inlet conduit comprises a first section extending alongside one of the growing assemblies and a second section extending across each of the growing assemblies.

12. The growing system of claim 11, further comprising an outlet manifold extending across each of the growing assemblies, wherein the outlet manifold is fluidly connected between each of the growing assemblies and the outlet conduit.

13. The growing system of claim 12, wherein each of the growing assemblies comprises an inlet hub fluidly connected to the second section of the inlet conduit.

14. The growing system of claim 13, wherein the inlet hub of each of the growing assemblies comprises a plurality of inlet pipes connected between the inlet conduit and each of the growing assemblies.

15. The growing system of claim 14, wherein each of the growing assemblies comprises a drainage hub fluidly connected to the outlet manifold.

16. The growing system of claim 15, wherein the drainage hub of each of the growing assemblies comprises a central drainage pipe which is fluidly connected to the outlet manifold.

17. A growing system, comprising:
   an inlet conduit fluidly connected to a fluid source;
   a pump for feeding a fluid from the fluid source to the inlet conduit;
   a growing assembly comprising a plurality of growing pipes for growing plants, wherein the growing assembly is fluidly connected to the inlet conduit such that the fluid passes through the growing assembly, wherein the growing assembly includes a plant support for supporting the plants grown in the growing pipes;
   a plurality of support lines, wherein each of the plurality of support lines extends above one of the plurality of growing pipes; and
   an outlet conduit fluidly connected to the growing assembly, wherein the outlet conduit is positioned so as to dispense fluids from the growing assembly back into the fluid source.

\* \* \* \* \*

UNITED STATES PATENT AND TRADEMARK OFFICE
CERTIFICATE OF CORRECTION

PATENT NO.        : 10,004,188 B2
APPLICATION NO.   : 15/788225
DATED             : June 26, 2018
INVENTOR(S)       : Justin S. Williams and Alexander M. Woods-Leo Page 1 of 1

It is certified that error appears in the above-identified patent and that said Letters Patent is hereby corrected as shown below:

In the Specification

Column 4, Lines 67-68, "including turning them on or oft in response to the data received from the probes 82" should read --including turning them on or off, in response to the data received from the probes 82--

Signed and Sealed this
Thirtieth Day of October, 2018

Andrei Iancu
*Director of the United States Patent and Trademark Office*